United States Patent
Shih

(10) Patent No.: US 10,540,312 B2
(45) Date of Patent: *Jan. 21, 2020

(54) SCALABLE POOLED NVME STORAGE BOX THAT COMPRISES A PCIE SWITCH FURTHER CONNECTED TO ONE OR MORE SWITCHES AND SWITCH PORTS

(71) Applicant: QUANTA COMPUTER INC., Taoyuan (TW)

(72) Inventor: Ching-Chih Shih, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/214,668

(22) Filed: Dec. 10, 2018

(65) Prior Publication Data
US 2019/0114279 A1    Apr. 18, 2019

Related U.S. Application Data

(63) Continuation of application No. 15/195,261, filed on Jun. 28, 2016, now Pat. No. 10,223,313.

(60) Provisional application No. 62/304,483, filed on Mar. 7, 2016.

(51) Int. Cl.
G06F 13/00    (2006.01)
G06F 13/40    (2006.01)
G06F 3/06     (2006.01)

(52) U.S. Cl.
CPC ........ *G06F 13/4022* (2013.01); *G06F 3/0607* (2013.01); *G06F 3/0635* (2013.01); *G06F 3/0688* (2013.01); *G06F 13/4068* (2013.01); *G06F 2213/0026* (2013.01)

(58) Field of Classification Search
CPC .................................................. G06F 13/4022
See application file for complete search history.

(56) References Cited

U.S. PATENT DOCUMENTS

| 9,229,854 B1 * | 1/2016 | Kuzmin ................. G06F 8/654 |
| 2015/0254003 A1 * | 9/2015 | Lee ....................... G06F 13/382 711/103 |
| 2015/0254088 A1 * | 9/2015 | Chou .................. G06F 9/45541 709/212 |

(Continued)

FOREIGN PATENT DOCUMENTS

JP    2010049637 A    3/2010

OTHER PUBLICATIONS

JP Office Action for Application No. 2017-041202, dated Feb. 19, 2018, w/ First Office Action Summary.

(Continued)

*Primary Examiner* — Tammara R Peyton
(74) *Attorney, Agent, or Firm* — Nixon Peabody LLP; Zhou Lu

(57) ABSTRACT

Various examples of the present technology provide a cluster-architecture to support a scalable pooled-NVMe storage box that can be shared among a scalable number of nodes. The scalable pooled-NVMe storage box comprises NVMe drives, one or more switches, and one or more switch ports. The number of NVMe drives in the scalable scalable-pooled-NVMe storage box can be scaled up or down based upon a number of nodes that need to share the scalable pooled-NVMe storage box.

20 Claims, 8 Drawing Sheets

(56) References Cited

U.S. PATENT DOCUMENTS

2016/0335209 A1* 11/2016 Jau .................... G06F 13/36
2017/0212858 A1* 7/2017 Chu ................. G06F 12/0246

OTHER PUBLICATIONS

TW Office Action for Application No. 105124918, dated Aug. 28, 2017, w/First Office Action Summary.
Extended European Search Report for EP Application No. 17157739.8, dated Aug. 10, 2017.

* cited by examiner

SCALABLE POOLED NVME STORAGE BOX THAT COMPRISES A PCIE SWITCH FURTHER CONNECTED TO ONE OR MORE SWITCHES AND SWITCH PORTS

CROSS-REFERENCE TO RELATED APPLICATIONS

This application is a Continuation of U.S. Non-Provisional application Ser. No. 15/195,261, entitled, "A SCALABLE POOLED NVME STORAGE BOX," filed Jun. 28, 2016, which claims priority to U.S. Provisional Application No. 62/304,483, entitled, "A SCALABLE POOLED NVME STORAGE BOX," filed on Mar. 7, 2016, which is incorporated herein by reference in its entirety.

TECHNICAL FIELD

The present technology relates generally to storage systems in a telecommunications network.

BACKGROUND

Capacities of Serial At Attachment (SATA) drives and Advanced Host Controller Interfaces (AHCIs) have been outpaced by growing speed of processors. Also, unrelenting data growth demands more efficient storage designs. In order to meet requirements of data storage and process needs from enterprises and individuals users, Non-Volatile Memory Express (NVMe) was developed to take advantage of data rich applications. A number of NVME Solid-state drives (SSDs) can be pooled together into a NVME storage box to improve datacenter efficiencies (e.g., share power and cooling units among SSDs of a NVME storage box).

However, it remains a challenge to improve scalability of a NVME storage box.

SUMMARY

Systems and methods in accordance with various examples of the present technology provide a solution to the above-mentioned problems in a rack system by providing a cluster-architecture to support a scalable pooled-NVMe storage box that can be shared among a scalable number of nodes. The scalable pooled-NVMe storage box comprises NVMe drives, one or more switches and one or more switch ports. The number of NVMe drives in the scalable scalable-pooled-NVMe storage box can be scaled up or down based upon a number of nodes that need to share the scalable pooled-NVMe storage box.

In conventional storage systems, bandwidth of SATA drives may have a 600 Gbps ceiling. The present disclosure provides a scalable cluster-architecture for a pooled-NVMe storage box that comprises NVMe drives (e.g., NVMe solid-state drives (SSDs)) that can be accessible via PCI Express (PCIe). The NVMe drives may offer capacities more than 1.5 GBps. For example, PCIe Gen 2 can offer approximately 500 MBps per lane and PCIe Gen 3 may offer approximately 985 MBps per lane. A x4 (i.e., four-lane) slot may provide a 2 GBps of bandwidth with Gen 2 and nearly 4 GBps with Gen 3.

Some examples provide a scalable cluster-architecture to support a scalable pooled-NVMe storage box comprising NVMe drives with dual ports. The number of the NVMe drives in the scalable pooled-NVMe storage box can be scaled up and down based upon a number of nodes that need to share the scalable pooled-NVMe storage box. For example, the scalable pooled-NVMe storage box can comprise a first plurality of NVMe drives, a first switch, a first switch port, and a first device port. Each of the first plurality of NVMe drives has a first port and a second port. The first plurality of NVMe drives can be connected to a first plurality of nodes via first ports of corresponding NVMe drives, and the first switch. In some examples, the first switch port and the first device port are connected. The first plurality of NVMe drives can also be connected to the first plurality of nodes via second ports of the corresponding NVMe drives, the first device port, the first switch port, and the first switch.

The scalable pooled-NVMe storage box can support two times a number of the first plurality of nodes (i.e., the first plurality of nodes and a second plurality of nodes) by doubling the number of the first plurality of NVMe drives with a small form factor. For example, the scalable pooled-NVMe storage box can be scaled up to further include a second plurality of NVMe drives, a second switch, a second switch port, and a second device port. Each of the second plurality of NVMe drives has a first port and a second port. The second plurality of nodes can be connected to the second plurality of NVMe drives via the second switch and first ports of corresponding NVMe drives. In some examples, the second device port can be connected to the second switch via the second switch port. The second plurality of nodes can also be connected to the second plurality of NVMe drives via the second switch, the second switch port, the second device port, and second ports of the corresponding NVMe drives. A specific NVMe drive in the scalable pooled-NVMe storage box can be accessible by any node of the first plurality of nodes and the second plurality of nodes. In other words, NVMe drives in the scalable pooled-NVMe storage box can be shared among the first plurality of nodes and the second plurality of nodes.

In some examples, a device port and a switch port in a scalable pooled-NVMe storage box can be combined into a single interface port to support functionalities of both the device port and the switch port. For example, a node can access to a particular NVMe drive in the scalable pooled-NVMe storage box via one of ports of the particular NVMe drive and the single interface port. In some examples, two or more NVMe drives in the scalable pooled-NVMe storage box can be dynamically assigned to two or more nodes to generate a high availability (HA) cluster. The HA cluster can be configured to support server applications with a minimum down-time.

Some examples provide a scalable cluster-architecture to support a scalable pooled-NVMe storage box comprising NVMe drives with a high bandwidth single port. The number of the NVMe drives in the scalable pooled-NVMe storage box can be scaled up and down based upon a number of nodes that need to share the scalable pooled-NVMe storage box. The scalable pooled-NVMe storage box can comprise a first plurality of NVMe drives, a first switch, and a first interface port. The first switch and the first interface port are connected. Each of the first plurality of NVMe drives has a single port. The first plurality of NVMe drives can be connected to a first plurality of nodes via the single ports of corresponding NVMe drives, and the first switch.

The scalable pooled-NVMe storage box can support two times a number of the first plurality of nodes (i.e., the first plurality of nodes and a second plurality of nodes) by doubling the number of the first plurality of NVMe drives that have a single port. For example, the scalable pooled-NVMe storage box can be scaled up to further include a second plurality NVMe drives, a second switch, and a second interface port. The second switch and the second interface port are connected. Each NVMe drive of the second plurality of NVMe drives comprises a single port. The second plurality of nodes is connected to the second plurality of NVMe drives via the second switch and the single ports of corresponding NVMe drives. The first interface port and the second interface port can be connected. Any specific NVMe drive in the scalable pooled-NVMe storage box can be accessed by the first plurality of nodes and the second plurality of nodes. For example, a particular NVMe drive in the scalable pooled-NVMe storage box can be accessed directly via the first switch or the second switch, or via a first connection path, the second switch-the second interface port-the first interface port, or a second connection path, the first switch-the first interface port-the second interface port.

BRIEF DESCRIPTION OF THE DRAWINGS

In order to describe the manner in which the above-recited and other advantages and features of the disclosure can be obtained, a more particular description of the principles briefly described above will be rendered by reference to specific examples thereof which are illustrated in the appended drawings. Understanding that these drawings depict only example aspects of the disclosure and are not therefore to be considered to be limiting of its scope, the principles herein are described and explained with additional specificity and detail through the use of the accompanying drawings in which.

DETAILED DESCRIPTION

Various examples of the present technology provide a cluster-architecture to support a scalable pooled-NVMe storage box that can be shared among a scalable number of nodes. The scalable pooled-NVMe storage box comprises NVMe drives, at least one switch and at least one switch port. The number of NVMe drives in the scalable pooled-NVMe storage box can be scaled up or down based upon a number of nodes that need to share the scalable pooled-NVMe storage box.

Figure 1A:
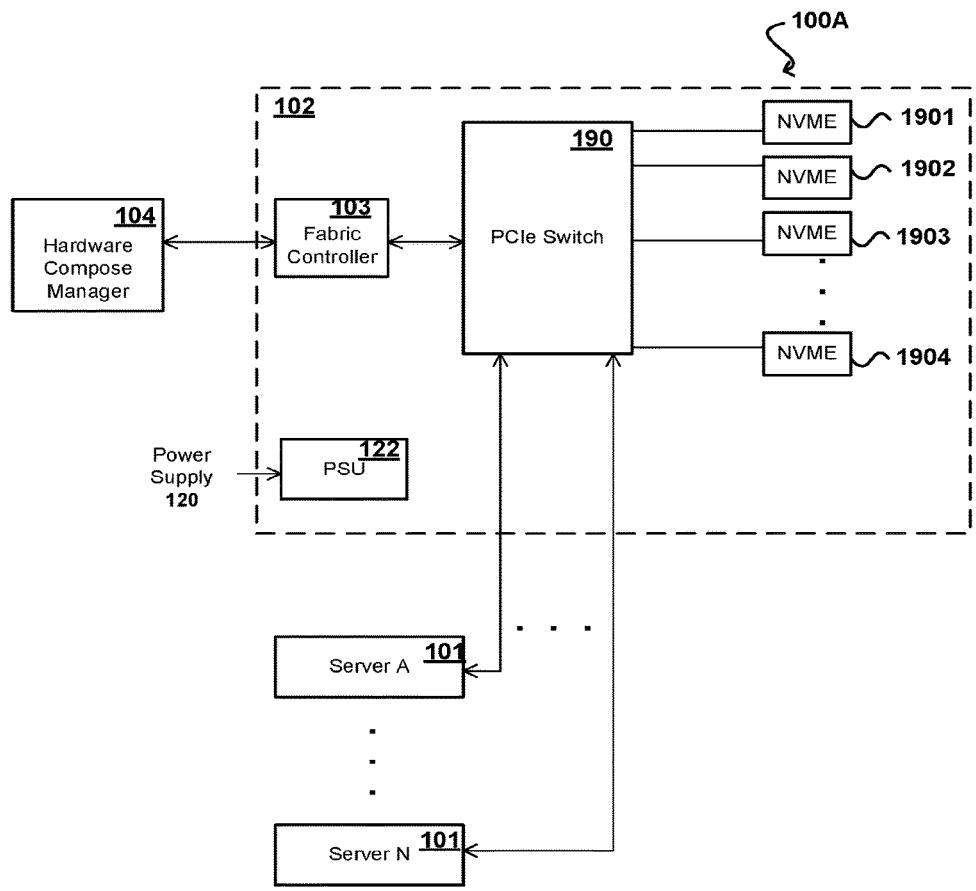
FIG. 1A illustrates a schematic block diagrams of an exemplary system containing a storage subsystem and a server system in accordance with some examples of the present technology.

FIG. 1A illustrates a schematic block diagram of an exemplary system 100A containing a storage subsystem 102 (e.g., a scalable pooled-NVMe storage box) and a plurality of nodes (e.g., server systems 101) in accordance with an implementation of the present technology. In this example, the storage subsystem 102 comprises one or more PSUs 122 that receive an AC power from the power supply 120 and provide power to the storage subsystem 102, at least one switch (e.g., PCIe switch 190), a plurality of storage NVMe drives (e.g., 1901, 1902, 1903 and 1904), and a fabric controller 103. PCI Express (PCIe) is an underlying data transport layer for graphics and other add-in cards, as well as interfaces (e.g., Thunderbolt interfaces). The storage devices may include at least one NVMe drive (e.g., a solid state drive (SSD)). Each of the at least one switch is configured to manage one or more storage devices of the storage subsystem 102 (e.g., receiving commands and routing them to the corresponding storage devices) and communicate with a remote device over a network, a management module, and other switch(es) of the storage subsystem 102. The commands may include read or write commands, information requests, or management commands (e.g., zoning commands). The command can be in a format of text, or PCIe interface. In this example, the switch 190 is configured to manage the storage devices 1901, 1902, 1903 and 1904.

The fabric controller 103 can provide the logic, instructions, and/or configuration for routing communications through the at least one switch to connect the plurality of storage NVMe drives to the server systems 101. The routing in the at least one switch can be configured by the fabric controller 103. In some examples, the fabric controller 103 can be implemented in a suitable operating system (OS), which includes, but is not limited to, Android, Berkeley Software Distribution (BSD), iPhone OS (iOS), Linux, OS X, Unix-like Real-time Operating System (e.g., QNX), Microsoft Windows, Window Phone, and IBM z/OS.

The storage subsystem 102 and the fabric controller 103 can communicate with a hardware compose manager 104 through a network interface (e.g., a serial interface). The hardware compose manager 104 can maintain information and data, such as hardware and configuration details, for the server systems 101, as well as any other devices or systems in one or more specific datacenters and/or networks. For example, the hardware compose manager 104 can maintain data indicating which NVMe drives are communicatively coupled with which server systems 101. The hardware compose manager 101 can also maintain data indicating which NVMe drives are available to be communicatively coupled with the server systems 101.

Furthermore, the hardware compose manager 104 can store install, remove, and/or recovery events and procedures. For example, the hardware compose manager 104 can maintain information and statistics about any devices added or removed from the server systems 101, any hardware errors experienced by the server systems 101, any recovery procedures performed by the server systems 101, any conditions hardware conditions experienced by the server systems 101 and/or plurality of storage NVMe drives, hardware status information associated with the server systems 101 and the plurality of storage NVMe drives, performance statistics, configuration data, link or routing information, and so forth.

In this example, the fabric controller 103 and/or the at least one switch (e.g., switch 190) can also provide a command-line interface (CLI) between the hardware compose manager 104 and the storage subsystem 102. The hardware compose manager 104 or remote user can input commands via the CLI or a network interface. The CLI includes, but is not limited to, digital command language (DCL), various Unix shells, control program for microcomputers (CP/M), command.com, cmd.exe, and resource time sharing system (RSTS) CLI. The remote device 103 or remote user can login onto a CLI of the storage subsystem 102 and using an application layer protocol and input zone IDs of a plurality of ports associated with the plurality of storage devices (e.g., 1901, 1902, 1903 and 1904) of the storage subsystem 102 via the CLI.

In some implementations, two or more servers 101, and switches and storage devices of the storage subsystem 102 are clustered into a HA cluster that provides continued service even when one storage device fails. Without the HA cluster, if a server running a particular application crashes, the application will be unavailable until the crashed server is fixed. The HA cluster can detect hardware or software faults on a server, and immediately restart the application on another server within the HA cluster without requiring administrator intervention. In some examples, storage device (e.g., NVMe drives) can be dual-port devices. Each port of the storage devices can be assigned to different servers 101 in HA applications.

Figure 1B:
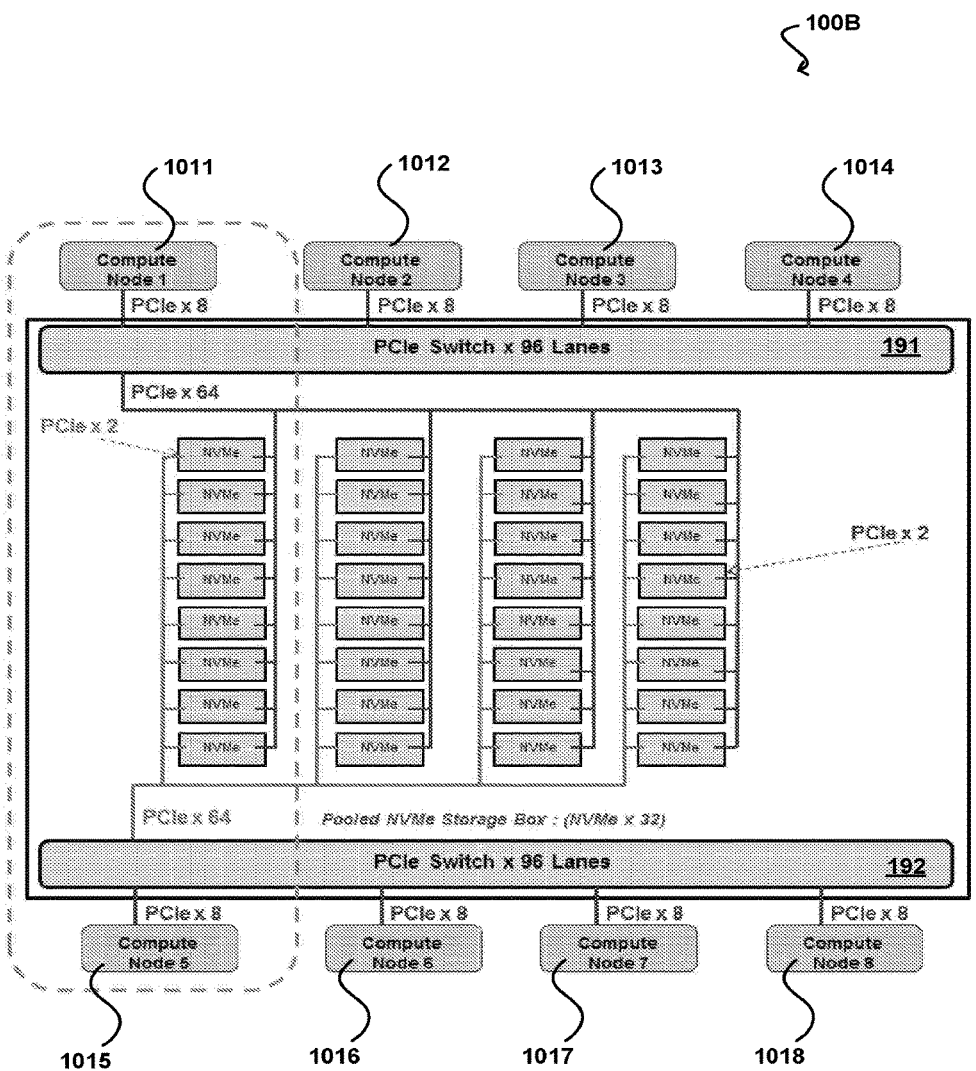
FIGS. 1B-1F illustrate schematic block diagrams of example pooled-NVMe storage boxes in accordance with some examples of the present technology.

FIGS. 1B-1F illustrate schematic block diagrams 100B-100F of example systems comprising at least one pooled-NVMe storage box in accordance with some examples of the present technology. In FIG. 1B, the example system 100B comprises a plurality of nodes (i.e., nodes 1011, 1012, 1013, 1014, 1015, 1016, 1017 and 1018), and a pooled-NVMe storage box that comprises PCIe switches (i.e., 191 and 192), and a plurality of storage devices (i.e., 32 NVMe drives). In this example, each of the plurality of storage devices has two ports, a first port and a second port. The plurality of storage devices are connected to nodes 1011, 1012, 1013 and 1014 via first ports of the plurality of storage devices and the PCIe switch 191. The plurality of storage devices are also connected to nodes 1015, 1016, 1017 and 1018 via second ports of the plurality of storage devices and the PCIe switch 192. The plurality of storage devices can be accessed by any of the nodes 1011, 1012, 1013, 1014, 1015, 1016, 1017 and 1018

Figure 1C:
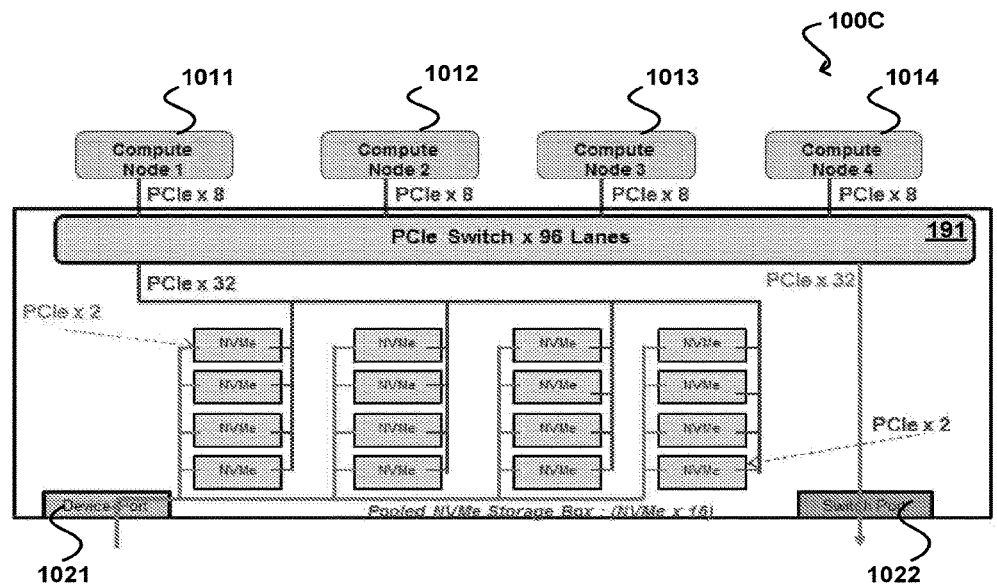

FIG. 1C illustrates an example system 100C that comprises a first plurality of nodes (i.e., nodes 1011, 1012, 1013, and 1014) and a scalable pooled-NVMe storage box. The scalable pooled-NVMe storage box comprises a PCIe switch (i.e., 191), and a first plurality of storage devices (i.e., 16 NVMe drives). In this example, each of the first plurality of storage devices has two ports, a first port and a second port. The first plurality of storage devices are connected to nodes 1011, 1012, 1013 and 1014 via first ports of the first plurality of storage devices and the PCIe switch 191. The plurality of storage devices are also connected to a device port 1021 via second ports of the plurality of storage devices. The number of NVMe drives in the scalable-pooled-NVMe storage box can be scaled up or down based upon a number of nodes that need to share the scalable-pooled-NVMe storage box.

For example, the scalable-pooled-NVMe storage box can scaled up to further comprise a second plurality of storage devices, a second switch, a second device port and a second switch port to support a second plurality of nodes (not shown). The first device port can be connected to the second switch port while the first switch port is connected to the second device port. Each node of the first plurality of nodes and the second plurality of nodes can access any storage device in the scalable pooled-NVMe storage box, which comprises both the first plurality of storage devices and the second plurality of storage devices.

Figure 1D:
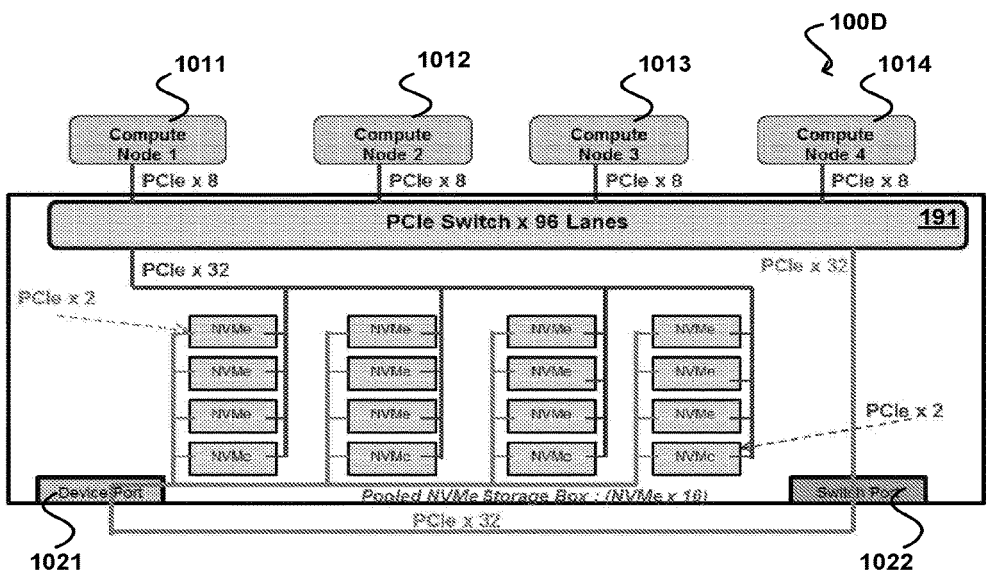

FIG. 1D illustrates an example system 100D that comprises a first plurality of nodes (i.e., nodes 1011, 1012, 1013, and 1014) and a scalable pooled-NVMe storage box. The scalable pooled-NVMe storage box of the example system 100D is an alternative architecture from the examiner system 100C. In this example, a first device port 1021 and a first switch port 1022 are connected. A first plurality of storage devices of the scalable pooled-NVMe storage box are connected to nodes 1011, 1012, 1013 and 1014 via first ports of the first plurality of storage devices and the PCIe switch 191. The plurality of storage devices are also connected to the nodes 1011, 1012, 1013 and 1014 via second ports of the plurality of storage devices, the first device port, the first switch port and the PCIe switch 191. In some examples, the first device port 1021 and the first switch port 1022 can be combined into a single interface port to support functionalities of both the first device port 1021 and the first switch port 1022.

Figure 1E:
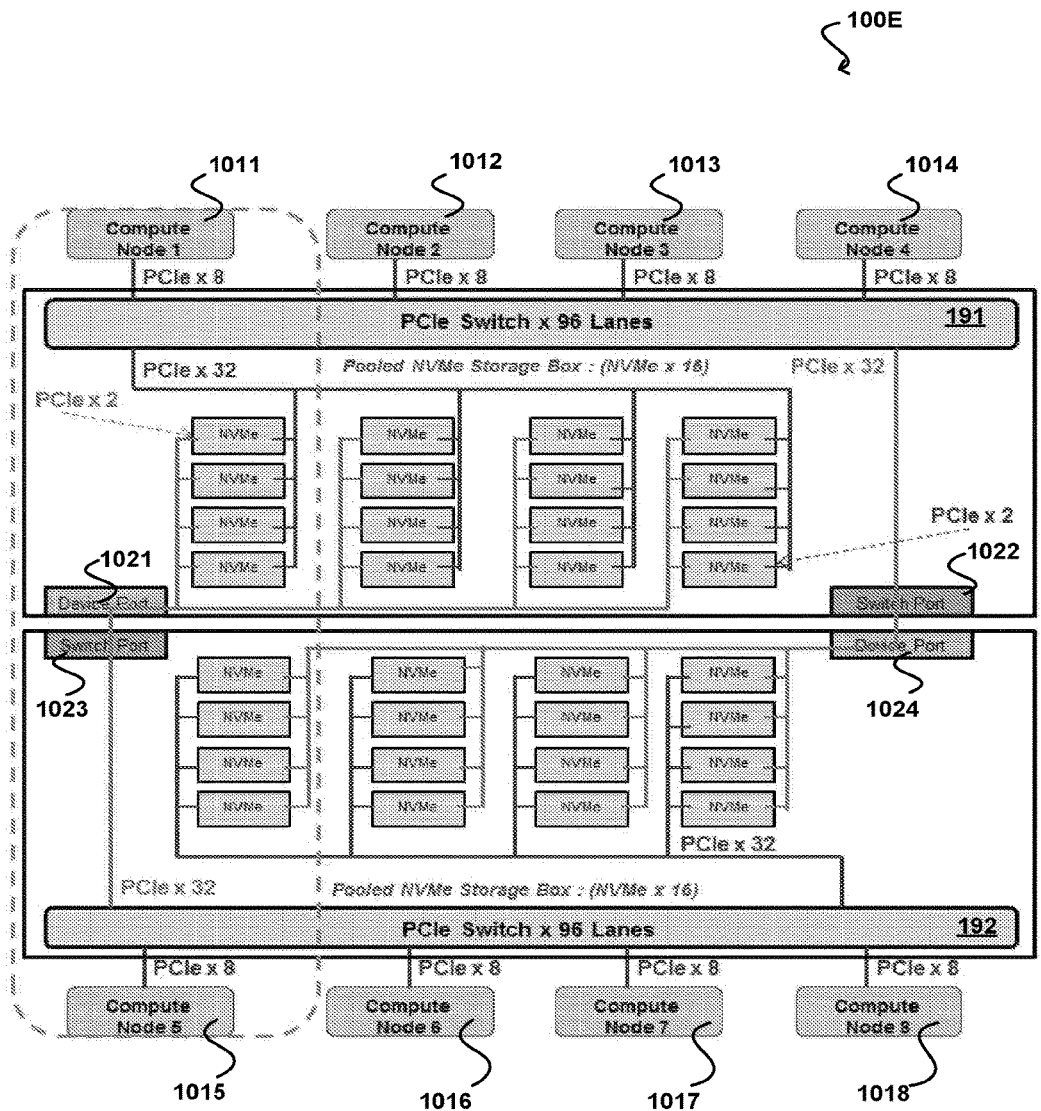

FIG. 1E illustrates an example system 100E that is scaled up from the example system 100C according to some examples. In this example, the scalable pooled-NVMe storage box comprises PCIe switches (i.e., 191 and 192), switch ports (i.e., 1022 and 1023), device ports (i.e., 1021 and 1023), and storage devices (i.e., 32 NVMe drives). The device port 1021 is connected to the switch port 1023 while the device port 1024 is connected to the switch port 1022. Any of the 32 NVMe drives in the scalable pooled-NVMe storage box can be accessed by nodes 1011, 1012, 1013, 1014, 1015, 1016, 1017 and 1018 either directly via the PCIe switch 191 or the PCIe switch 192, or via a first connection path, the PCIe switch 191—the switch port 1022—the device port 1024, or via a second connection path, the PCIe switch 192—the switch port 1023—the device port 1021.

Figure 1F:
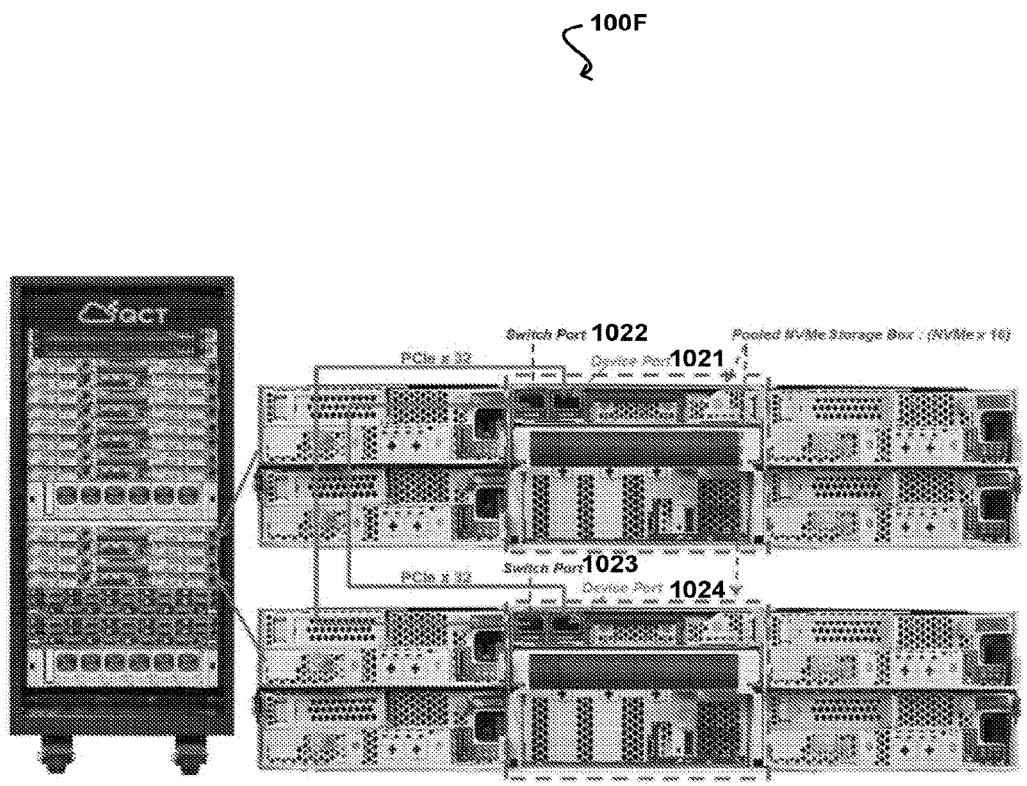

FIG. 1F illustrates an example rack system 100F that comprising the example system 100E according to some examples. In this example, a scalable pooled-NVMe storage box of the rack system 100F can be scaled up or down based upon a number of nodes that need to share the scalable pooled-NVMe storage box. The scalable pooled-NVMe storage box can comprise a switch port 1022, a device port 1021, and a first plurality of NVMe drives (i.e., 16 NVMe drives). The scalable pooled-NVMe storage box can also be scaled up to further comprise a switch port 1023, a device port 1024 and a second plurality of NVMe drives (i.e., 16 NVMe drives). The switch port 1022 is connected to the device port 1024 while the switch port 1023 is connected to the device port 1021. Any particular NVMe drive in the scalable pooled-NVMe storage box (i.e., one of the 32 NVMe drives) can be accessed by nodes assigned to the scalable pooled-NVMe storage box.

In some examples, two or more NVMe drives of the scalable pooled-NVMe storage box can be assigned to two or more nodes to form a HA cluster. The HA cluster can provide continued services even when a node or component of the HA cluster fails. The HA cluster may detect a warning sign or hardware/software fault, and immediately restart affected or potentially affected application on another a node without any administrative intervention.

Although only certain components are shown within the exemplary systems 100A-100F in FIGS. 1A-1F, various types of electronic or computing components that are capable of processing or storing data, or receiving or transmitting signals can also be included in the exemplary systems 100A-100F. Further, the electronic or computing components in the exemplary systems 100A-100F can be configured to execute various types of application and/or can use various types of operating systems. These operating systems can include, but are not limited to, Android, Berkeley Software Distribution (BSD), iPhone OS (iOS), Linux, OS X, Unix-like Real-time Operating System (e.g., QNX), Microsoft Windows, Window Phone, and IBM z/OS.

Depending on the desired implementation for the exemplary systems 100A-100F, a variety of networking and messaging protocols can be used, including but not limited to IPMI or Redfish etc. Other suitable protocols may also be used to implement the present technology. As would be appreciated by those skilled in the art, the exemplary systems 100A-100F illustrated in FIGS. 1A-1F are used for purposes of explanation. Therefore, a network system can be implemented with many variations, as appropriate, yet still provide a configuration of network platform in accordance with various examples of the present technology.

In exemplary configurations of FIGS. 1A-1F, the storage subsystem 102 can also include one or more wireless components operable to communicate with one or more electronic devices within a computing range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections, as known in the art. Various other elements and/or combinations are possible as well within the scope of various examples.

The above discussion is meant to be illustrative of the principles and various examples of the present technology. Numerous variations and modifications will become apparent once the above disclosure is fully appreciated.

Figure 2:
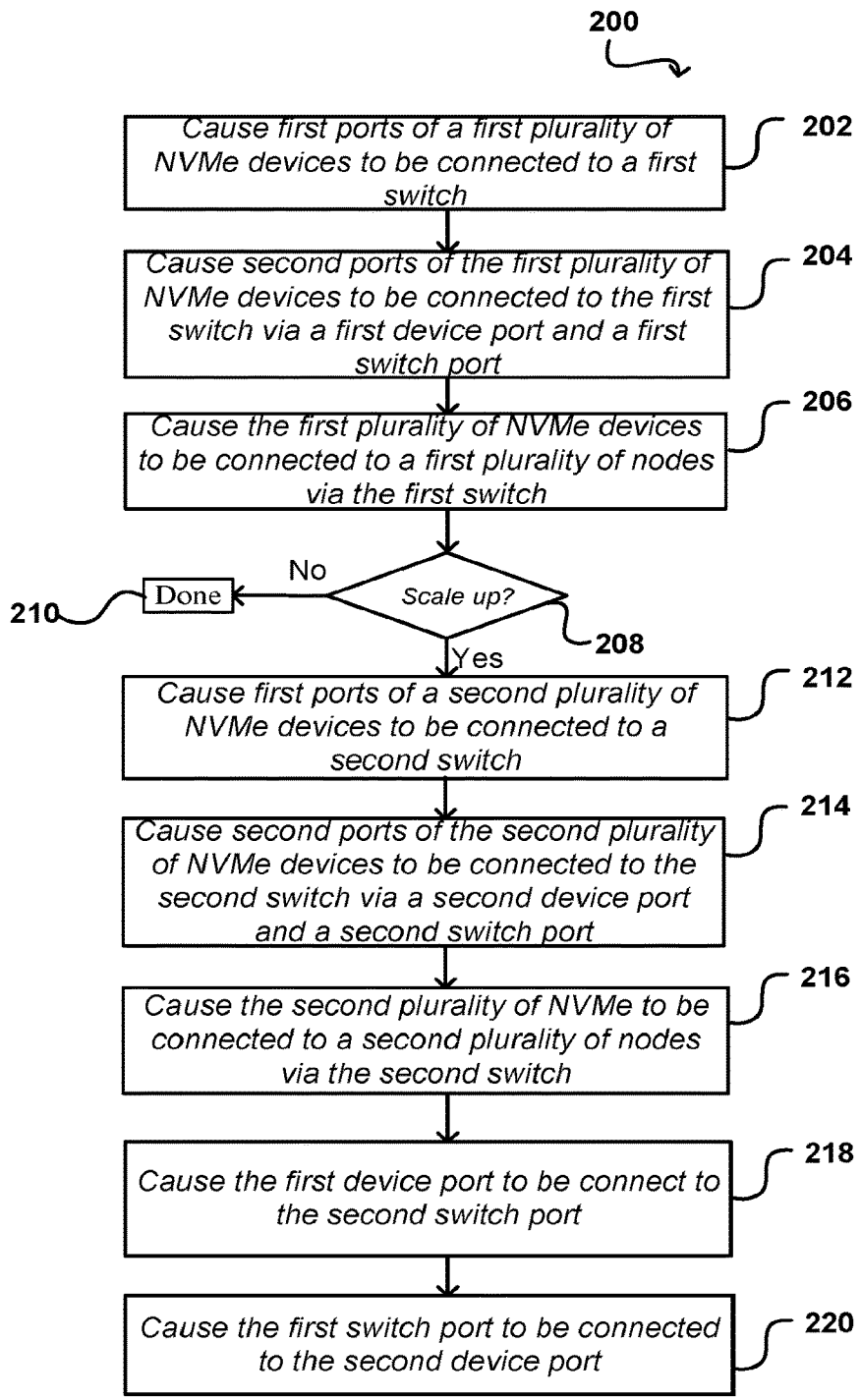
FIG. 2 illustrates an exemplary method of supporting a scalable pooled-NVMe storage box in accordance with some examples of the present technology.

FIG. 2 illustrates an exemplary method 200 of supporting a scalable pooled-NVMe storage box in accordance with some examples of the present technology. In this example, the scalable pooled-NVMe storage box comprises a first plurality of NVMe drives. Each of the first plurality of NVMe drives comprises a first port and a second port, as illustrated in exemplary systems 100A-100F. It should be understood that the exemplary method 200 is presented solely for illustrative purposes and that in other methods in accordance with the present technology can include additional, fewer, or alternative steps performed in similar or alternative orders, or in parallel.

The exemplary method 200 starts with connecting first ports of the first plurality of NVMe drives to a first switch of the scalable pooled-NVMe storage box, at step 202, and connecting second ports of the first plurality of NVMe drives to the first switch via a first device port and a first switch port of the scalable pooled-NVMe storage box, at step 204. The first plurality of NVMe drives can be connected to a first plurality of nodes via the first switch, at step 206. Each NVMe drive of the first plurality of NVMe drives can be shared among the first plurality of nodes via either the first port or the second port of the corresponding NVMe drives, as illustrated in FIGS. 1B-1F. In some examples, the first device port and the first switch port can be combined into a first interface port to support functionalities of both the first device port and the first switch port.

At step 208, a determination can be made whether to scale up a number of NVMe drives of the scalable pooled-NVMe storage box based upon a number of nodes that need to share the scalable pooled-NVMe storage box. In respond to determining that there is no need to scale up the number of NVMe drives of the scalable pooled-NVMe storage box, the exemplary method 200 ends, at step 210.

In respond to determining that the scalable pooled-NVMe storage box needs to be scaled up to support a second plurality of nodes, the exemplary method 200 further connect first ports of a second plurality of NVMe drives to a second switch, at step 212, and connect second ports of the second plurality of NVMe drives to the second switch via a second device port and a second switch port, at step 214. Each of the second plurality of NVMe drives comprises a first port and a second port. The second plurality of NVMe drives can be connected to the second plurality of nodes via the second switch, at step 216. Each NVMe drive of the second plurality of NVMe drives can be shared among the second plurality of nodes via either the first port or the second port of the corresponding NVMe drive.

At step 218, the first device port and the second switch port are connected. At step 220, the first switch port and the second device port are connected, as illustrated in FIGS. 1E-1F. The scalable pooled-NVMe storage box comprises scaled-up NVMe drives that include the first plurality of NVMe drive and the second plurality of NVMe drives. Each NVMe drive of the scalable pooled-NVMe storage box can be shared among the first plurality of nodes and the second plurality of nodes. A particular NVMe drive of the scalable pooled-NVMe storage box can be accessible either directly via the first switch or the second switch, or via a connection path. The connection path may include, but is not limited to, the first switch-the first switch port-the first device port, the second switch-the second switch port-the first device port, the first switch-the first switch port-the second device port, or the second switch-the second switch port-the second device port. In some examples, the connection path may also include, the first switch-the first switch port-the second device port-the second switch port-the first device port, or the second switch-the second switch port-the first device port-the first switch port-the second device port.

In some examples, each of NVMe drives of the scalable pooled-NVMe storage box only comprises a high bandwidth single port. The scalable pooled-NVMe storage box can comprise a first plurality of NVMe drives, a first switch, and a first interface port. The first switch and the first interface port are connected. The first plurality of NVMe drives can be connected to a first plurality of nodes via the single ports of corresponding NVMe drives, and the first switch. The number of the NVMe drives in the scalable pooled-NVMe storage box can also be scaled up and down based upon a number of nodes that need to share the scalable pooled-NVMe storage box.

Terminologies

Cloud computing can be provided in one or more networks to provide computing services using shared resources. Cloud computing can generally include Internet-based computing in which computing resources are dynamically provisioned and allocated to client or user computers or other devices on-demand, from a collection of resources available via the network (e.g., "the cloud"). Cloud computing resources, for example, can include any type of resource, such as computing, storage, and network devices, virtual machines (VMs), etc. For instance, resources can include service devices (firewalls, deep packet inspectors, traffic monitors, load balancers, etc.), compute/processing devices (servers, CPU's, memory, brute force processing capability), storage devices (e.g., network attached storages, storage area network devices), etc. In addition, such resources can be used to support virtual networks, virtual machines (VM), databases, applications (Apps), etc.

Cloud computing resources can include a "private cloud," a "public cloud," and/or a "hybrid cloud." A "hybrid cloud" can be a cloud infrastructure composed of two or more clouds that inter-operate or federate through technology. In essence, a hybrid cloud is an interaction between private and public clouds where a private cloud joins a public cloud and utilizes public cloud resources in a secure and scalable manner. Cloud computing resources can also be provisioned via virtual networks in an overlay network, such as a VXLAN.

Figure 3:
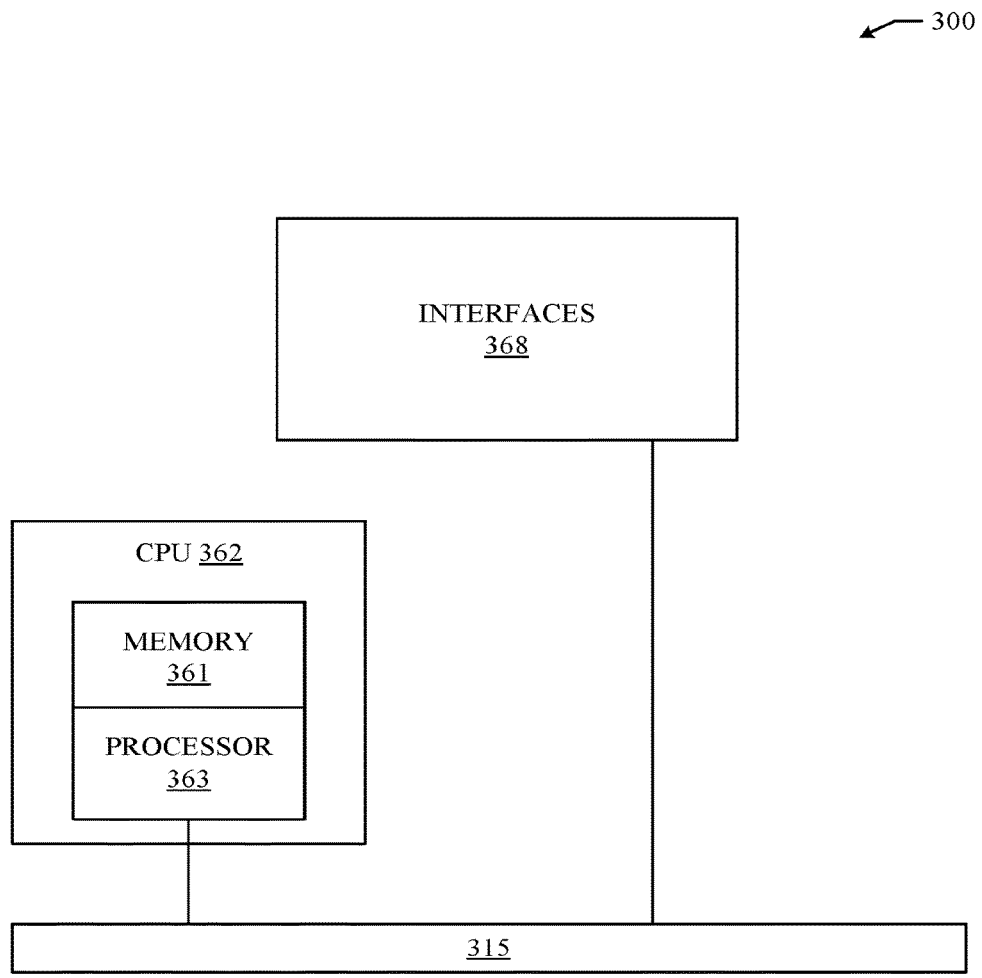
FIG. 3 illustrates an exemplary computing device in accordance with various examples of the technology.
Figure 4:
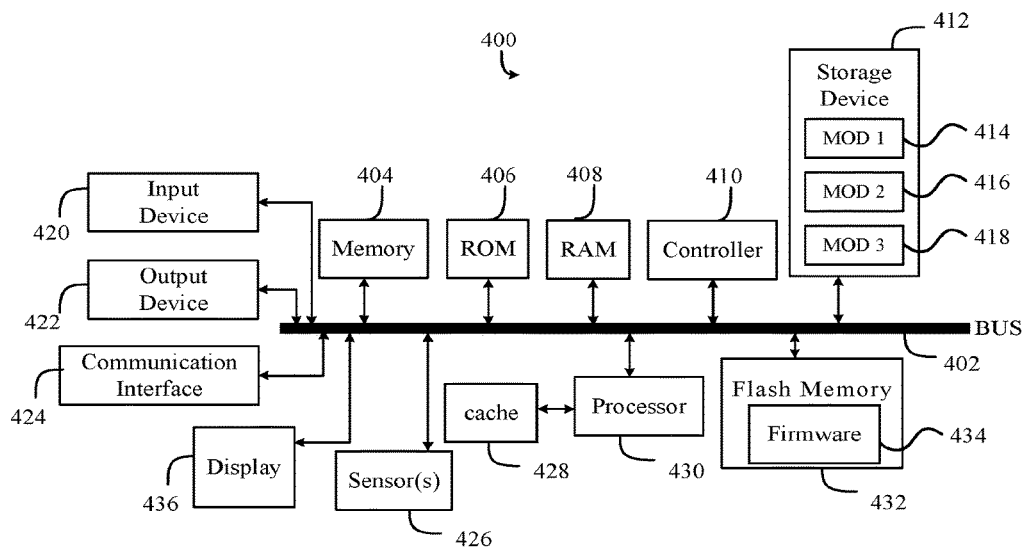
FIGS. 4 and 5 illustrate exemplary systems in accordance with various examples of the present technology.
Figure 5:
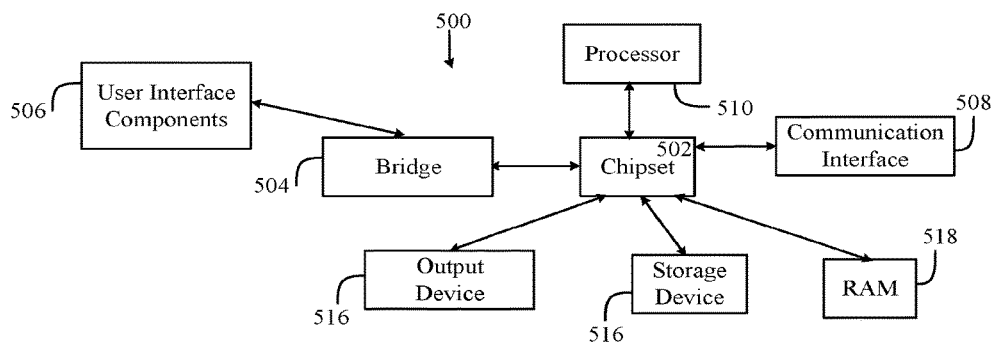

A brief introductory description of example systems and networks, as illustrated in FIGS. 3, 4 and 5, is disclosed herein. These variations shall be described herein as the various examples are set forth. The technology now turns to FIG. 3.

FIG. 3 illustrates an example computing device 300 suitable for implementing the present technology. Computing device 300 includes a master central processing unit (CPU) 362, interfaces 368, and a bus 315 (e.g., a PCI bus). When acting under the control of appropriate software or firmware, the CPU 362 is responsible for executing packet management, error detection, and/or routing functions, such as miscabling detection functions, for example. The CPU 362 preferably accomplishes all these functions under the control of software including an operating system and any appropriate applications software. CPU 362 can include one or more processors 363 such as a processor from the Motorola family of microprocessors or the MIPS family of microprocessors. In an alternative example, processor 363 is specially designed hardware for controlling the operations of the computing device 300. In a specific example, a memory 361 (such as non-volatile RAM and/or ROM) also forms part of CPU 362. However, there are many different ways in which memory could be coupled to the system.

The interfaces 368 are typically provided as interface cards (sometimes referred to as "line cards"). Generally, they control the sending and receiving of data packets over the network and sometimes support other peripherals used with the computing device 300. Among the interfaces that can be provided are Ethernet interfaces, frame relay interfaces, cable interfaces, DSL interfaces, token ring interfaces, and the like. In addition, various very high-speed interfaces can be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces can include ports appropriate for communication with the appropriate media. In some cases, they can also include an independent processor and, in some instances, volatile RAM. The independent processors can control such communications intensive tasks as packet switching, media control and management. By providing separate processors for the communications intensive tasks, these interfaces allow the master microprocessor 362 to efficiently perform routing computations, network diagnostics, security functions, etc.

Although the system shown in FIG. 3 is one specific computing device of the present technology, it is by no means the only network device architecture on which the present patent application can be implemented. For example, an architecture having a single processor that handles communications as well as routing computations, etc. is often used. Further, other types of interfaces and media could also be used with the router.

Regardless of the network device's configuration, it can employ one or more memories or memory modules (including memory 361) configured to store program instructions for the general-purpose network operations and mechanisms for roaming, route optimization and routing functions described herein. The program instructions can control the operation of an operating system and/or one or more applications, for example. The memory or memories can also be configured to store tables such as mobility binding, registration, and association tables, etc.

FIGS. 4 and 5 illustrate example system embodiments. The more appropriate embodiment will be apparent to those of ordinary skill in the art when practicing the present technology. Persons of ordinary skill in the art will also readily appreciate that other system embodiments are possible.

FIG. 4 illustrates a system bus computing system architecture 400 wherein the components of the system are in electrical communication with each other using a bus 402. Example system 400 includes a processing unit (CPU or processor) 430 and a system bus 402 that couples various system components including the system memory 404, such as read only memory (ROM) 406 and random access memory (RAM) 408, to the processor 430. The system 400 can include a cache of high-speed memory connected directly with, in close proximity to, or integrated as part of the processor 430. The system 400 can copy data from the memory 404 and/or the storage device 412 to the cache 428 for quick access by the processor 430. In this way, the cache can provide a performance boost that avoids processor 430 delays while waiting for data. These and other modules can control or be configured to control the processor 430 to perform various actions. Other system memory 404 may be available for use as well. The memory 404 can include multiple different types of memory with different performance characteristics. The processor 430 can include any general purpose processor and a hardware module or software module, such as module 1 414, module 2 416, and module 3 418 stored in storage device 412, configured to control the processor 430 as well as a special-purpose processor where software instructions are incorporated into the actual processor design. The processor 430 may essentially be a completely self-contained computing system, containing multiple cores or processors, a bus, memory controller, cache, etc. A multi-core processor may be symmetric or asymmetric.

To enable user interaction with the computing device 400, an input device 420 can represent any number of input mechanisms, such as a microphone for speech, a touch-sensitive screen for gesture or graphical input, keyboard, mouse, motion input, speech and so forth. An output device 422 can also be one or more of a number of output mechanisms known to those of skill in the art. In some instances, multimodal systems can enable a user to provide multiple types of input to communicate with the system 400. The communications interface 424 can generally govern and manage the user input and system output. There is no restriction on operating on any particular hardware arrangement and therefore the basic features here may easily be substituted for improved hardware or firmware arrangements as they are developed.

Storage device 412 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 408, read only memory (ROM) 406, and hybrids thereof.

The storage device 412 can include software modules 414, 416, 418 for controlling the processor 430. Other hardware or software modules are contemplated. The storage device 412 can be connected to the system bus 402. In one aspect, a hardware module that performs a particular function can include the software component stored in a computer-readable medium in connection with the necessary hardware components, such as the processor 430, bus 402, display 436, and so forth, to carry out the function.

The controller 410 can be a specialized microcontroller or processor on the system 400, such as a BMC (baseboard management controller). In some cases, the controller 410 can be part of an Intelligent Platform Management Interface (IPMI). Moreover, in some cases, the controller 410 can be embedded on a motherboard or main circuit board of the system 400. The controller 410 can manage the interface between system management software and platform hardware. The controller 410 can also communicate with various system devices and components (internal and/or external), such as controllers or peripheral components, as further described below.

The controller 410 can generate specific responses to notifications, alerts, and/or events and communicate with remote devices or components (e.g., electronic mail message, network message, etc.), generate an instruction or command for automatic hardware recovery procedures, etc. An administrator can also remotely communicate with the controller 410 to initiate or conduct specific hardware recovery procedures or operations, as further described below.

Different types of sensors (e.g., sensors 426) on the system 400 can report to the controller 410 on parameters such as cooling fan speeds, power status, operating system (OS) status, hardware status, and so forth. The controller 410 can also include a system event log controller and/or storage for managing and maintaining events, alerts, and notifications received by the controller 410. For example, the controller 410 or a system event log controller can receive alerts or notifications from one or more devices and components and maintain the alerts or notifications in a system even log storage component.

Flash memory 432 can be an electronic non-volatile computer storage medium or chip which can be used by the system 400 for storage and/or data transfer. The flash memory 432 can be electrically erased and/or reprogrammed. Flash memory 432 can include erasable programmable read-only memory (EPROM), electrically erasable programmable read-only memory (EEPROM), ROM, NVRAM, or complementary metal-oxide semiconductor (CMOS), for example. The flash memory 432 can store the firmware 434 executed by the system 400 when the system 400 is first powered on, along with a set of configurations specified for the firmware 434. The flash memory 432 can also store configurations used by the firmware 434.

The firmware 434 can include a Basic Input/Output System or its successors or equivalents, such as an Extensible Firmware Interface (EFI) or Unified Extensible Firmware Interface (UEFI). The firmware 434 can be loaded and executed as a sequence program each time the system 400 is started. The firmware 434 can recognize, initialize, and test hardware present in the system 400 based on the set of configurations. The firmware 434 can perform a self-test, such as a Power-on-Self-Test (POST), on the system 400. This self-test can test functionality of various hardware components such as hard disk drives, optical reading devices, cooling devices, memory modules, expansion cards and the like. The firmware 434 can address and allocate an area in the memory 404, ROM 406, RANI 408, and/or storage device 412, to store an operating system (OS). The firmware 434 can load a boot loader and/or OS, and give control of the system 400 to the OS.

The firmware 434 of the system 400 can include a firmware configuration that defines how the firmware 434 controls various hardware components in the system 400. The firmware configuration can determine the order in which the various hardware components in the system 400 are started. The firmware 434 can provide an interface, such as an UEFI, that allows a variety of different parameters to be set, which can be different from parameters in a firmware default configuration. For example, a user (e.g., an administrator) can use the firmware 434 to specify clock and bus speeds, define what peripherals are attached to the system 400, set monitoring of health (e.g., fan speeds and CPU temperature limits), and/or provide a variety of other parameters that affect overall performance and power usage of the system 400.

While firmware 434 is illustrated as being stored in the flash memory 432, one of ordinary skill in the art will readily recognize that the firmware 434 can be stored in other memory components, such as memory 404 or ROM 406, for example. However, firmware 434 is illustrated as being stored in the flash memory 432 as a non-limiting example for explanation purposes.

System 400 can include one or more sensors 426. The one or more sensors 426 can include, for example, one or more temperature sensors, thermal sensors, oxygen sensors, chemical sensors, noise sensors, heat sensors, current sensors, voltage detectors, air flow sensors, flow sensors, infrared thermometers, heat flux sensors, thermometers, pyrometers, etc. The one or more sensors 426 can communicate with the processor, cache 428, flash memory 432, communications interface 424, memory 404, ROM 406, RAM 408, controller 410, and storage device 412, via the bus 402, for example. The one or more sensors 426 can also communicate with other components in the system via one or more different means, such as inter-integrated circuit (I2C), general purpose output (GPO), and the like.

FIG. 5 illustrates an example computer system 500 having a chipset architecture that can be used in executing the described method(s) or operations, and generating and displaying a graphical user interface (GUI). Computer system 500 can include computer hardware, software, and firmware that can be used to implement the disclosed technology. System 500 can include a processor 510, representative of any number of physically and/or logically distinct resources capable of executing software, firmware, and hardware configured to perform identified computations. Processor 510 can communicate with a chipset 502 that can control input to and output from processor 510. In this example, chipset 502 outputs information to output 514, such as a display, and can read and write information to storage device 516, which can include magnetic media, and solid state media, for example. Chipset 502 can also read data from and write data to RANI 518. A bridge 504 for interfacing with a variety of user interface components 506 can be provided for interfacing with chipset 502. Such user interface components 506 can include a keyboard, a microphone, touch detection and processing circuitry, a pointing device, such as a mouse, and so on. In general, inputs to system 500 can come from any of a variety of sources, machine generated and/or human generated.

Chipset 502 can also interface with one or more communication interfaces 508 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 510 analyzing data stored in storage 516 or 518. Further, the machine can receive inputs from a user via user interface components 506 and execute appropriate functions, such as browsing functions by interpreting these inputs using processor 510.

Moreover, chipset 502 can also communicate with firmware 512, which can be executed by the computer system 500 when powering on. The firmware 502 can recognize, initialize, and test hardware present in the computer system 500 based on a set of firmware configurations. The firmware 512 can perform a self-test, such as a POST, on the system 500. The self-test can test functionality of the various hardware components 502-518. The firmware 512 can address and allocate an area in the memory 518 to store an OS. The firmware 512 can load a boot loader and/or OS, and give control of the system 500 to the OS. In some cases, the firmware 512 can communicate with the hardware components 502-510 and 514-518. Here, the firmware 512 can communicate with the hardware components 502510 and 514-518 through the chipset 502 and/or through one or more other components. In some cases, the firmware 512 can communicate directly with the hardware components 502510 and 514-518.

It can be appreciated that example systems 400 and 500 can have more than one processor (e.g., 430, 510) or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described herein.

Various aspects of the present technology provide systems and methods for supporting a scalable pooled-NVMe storage box in a server system. While specific examples have been cited above showing how the optional operation can be employed in different instructions, other examples can incorporate the optional operation into different instructions. For clarity of explanation, in some instances the present technology can be presented as including individual functional blocks including functional blocks comprising devices, device components, steps or routines in a method embodied in software, or combinations of hardware and software.

The various examples can be further implemented in a wide variety of operating environments, which in some cases can include one or more server computers, user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

To the extent examples, or portions thereof, are implemented in hardware, the present patent application can be implemented with any or a combination of the following technologies: a discrete logic circuit(s) having logic gates for implementing logic functions upon data signals, an application specific integrated circuit (ASIC) having appropriate combinational logic gates, programmable hardware such as a programmable gate array(s) (PGA), a field programmable gate array (FPGA), etc.

Most examples utilize at least one network that would be familiar to those skilled in the art for supporting communications. The network can be, for example, a local area network, a wide-area network, a virtual private network, the Internet, an intranet, an extranet, a public switched telephone network, an infrared network, a wireless network and any combination thereof Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions can be, for example, binaries, intermediate format instructions such as assembly language, firmware, or source code. Examples of computer-readable media that can be used to store instructions, information used, and/or information created during methods according to described examples include magnetic or optical disks, flash memory, USB devices provided with non-volatile memory, networked storage devices, and so on.

Devices implementing methods according to these technologies can comprise hardware, firmware and/or software, and can take any of a variety of form factors. Typical examples of such form factors include server computers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

In examples utilizing a Web server, the Web server can run any of a variety of server or mid-tier applications, including HTTP servers, FTP servers, CGI servers, data servers, Java servers and business application servers. The server(s) can also be capable of executing programs or scripts in response requests from user devices, such as by executing one or more Web applications that can be implemented as one or more scripts or programs written in any programming language, such as Java®, C, C# or C++ or any scripting language, such as Perl, Python or TCL, as well as combinations thereof. The server(s) can also include database servers, including without limitation those commercially available from open market.

The server system can include a variety of data stores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system can also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared computing device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate examples can have numerous variations from that described above. For example, customized hardware might also be used and/or particular elements might be implemented in hardware, software (including portable software, such as applets) or both. Further, connection to other computing devices such as network input/output devices can be employed.

Storage media and computer readable media for containing code, or portions of code, can include any appropriate media known or used in the art, including storage media and computing media, such as but not limited to volatile and non-volatile, removable and non-removable media implemented in any method or technology for storage and/or transmission of information such as computer readable instructions, data structures, program modules or other data, including RAM, ROM, EPROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the technology and teachings provided herein, a person of ordinary skill in the art will appreciate other ways and/or methods to implement the various aspects of the present technology.

The specification and drawings are, accordingly, to be regarded in an illustrative rather than a restrictive sense. It will, however, be evident that various modifications and changes can be made thereunto without departing from the broader spirit and scope of the patent application as set forth in the claims.

I claim:

1. A scalable storage box, comprising:
a first PCI Express (PCIe) switch;
a first switch port connected to the first PCIe switch;
a first device port; and
a first plurality of devices, each device of the first plurality of devices comprising a first port and a second port, wherein first ports of the first plurality of devices are connected to a first plurality of nodes via the first PCIe switch, wherein second ports of the first plurality of devices are connected to the first device port.

2. The scalable storage box of claim 1, further comprising:
a second PCIe switch;
a second switch port connected to the second PCIe switch;
a second device port; and
a second plurality of devices, each device of the second plurality of devices comprising a first port and a second port,
wherein first ports of the second plurality of devices are connected to a second plurality of nodes via the second PCIe switch,
wherein second ports of the second plurality of devices are connected to the second device port,
wherein the first device port is connected to the second switch port, wherein the first switch port is connected to the second device port.

3. The scalable storage box of claim 2, wherein each device of the first plurality of devices is shared among the first plurality of nodes via the first PCIe switch, and wherein each device of the first plurality of devices is shared among the second plurality of nodes via a connection path comprising the second PCIe switch-the second switch port-the first device port.

4. The scalable storage box of claim 2, wherein each device of the second plurality of devices is shared among the second plurality of nodes via the second PCIe switch, and wherein each device of the second plurality of devices is shared among the first plurality of nodes via a connection path comprising the first PCIe switch-the first switch port-the second device port.

5. The scalable storage box of claim 1, wherein the first switch port and the first device port are connected.

6. The scalable storage box of claim 1, wherein the first switch port and the first device port are combined into a first interface port.

7. The scalable storage box of claim 6, wherein a particular device of the first plurality of devices is connected to the first plurality of devices via the first port of the particular device and the first PCIe switch, or via the second port of the particular device, the first interface port and the first PCIe switch.

8. The scalable storage box of claim 7, further comprising:
a second PCIe switch;
a second interface port connected to the second PCIe switch; and
a second plurality of devices, each device of the second plurality of devices comprising a first port and a second port,
wherein first ports of the second plurality of devices are connected to a second plurality of nodes via the second PCIe switch,
wherein second ports of the second plurality of devices are connected to the second interface port,
wherein the second interface port is connected to the first interface port.

9. The scalable storage box of claim 8, wherein each device of the second plurality of devices is shared among the second plurality of nodes via the second PCIe switch, wherein each device of the second plurality of devices is shared among the first plurality of nodes via a connection path comprising the first PCIe switch-the first interface port-the second interface port.

10. The scalable storage box of claim 1, wherein two or more devices of the first plurality of devices are clustered together with two or more nodes of the first plurality of nodes to generate a high availability (HA) cluster.

11. A computer-implemented method for supporting a scalable storage box that comprises a first PCI Express (PCIe) switch, a first switch port connected to the first PCIe switch, a first device port and a first plurality of devices, each device of the first plurality of devices comprising a first port and a second port, comprising:
connecting first ports of the first plurality of devices to the first PCIe switch;
connecting second ports of the first plurality of devices to the first device port; and
connecting the first plurality of devices to a first plurality of nodes via the first PCIe switch.

12. The computer-implemented method of claim 11, further comprising:
determining that the scalable storage box has to support a second plurality of nodes, wherein the scalable storage box further comprises a second PCI Express (PCIe) switch, a second switch port connected to the second PCIe switch, a second device port and a second plurality of devices, each device of the second plurality of devices comprising a first port and a second port;
connecting first ports of the second plurality of devices to the second PCIe switch;
connecting second ports of the second plurality of devices to the second device port;
connecting the first device port to the second switch port; and
connecting the first switch port to the second device port.

13. The computer-implemented method of claim 12, wherein each device of the first plurality of devices is shared among the first plurality of nodes via the first PCIe switch, and wherein each device of the first plurality of devices is shared among the second plurality of nodes via a connection path comprising the second PCIe switch-the second switch port-the first device port.

14. The computer-implemented method of claim 12, wherein each device of the second plurality of devices is shared among the second plurality of nodes via the second PCIe switch, and wherein each device of the second plurality of devices is shared among the first plurality of nodes via a connection path comprising the first PCIe switch-the first switch port-the second device port.

15. The computer-implemented method of claim 11, wherein the first switch port and the first device port are connected.

16. The computer-implemented method of claim 11, wherein the first switch port and the first device port are combined into a first interface port.

17. The computer-implemented method of claim 16, wherein a particular device of the first plurality of devices is connected to the first plurality of devices via the first port of the particular device and the first PCIe switch, or via the second port of the particular device, the first interface port and the first PCIe switch.

18. The computer-implemented method of claim 17, further comprising:
determining that the scalable storage box has to support a second plurality of nodes, wherein the scalable storage box further comprises a second PCI Express (PCIe) switch, a second interface port connected to the second PCIe switch, and a second plurality of devices, each device of the second plurality of devices comprising a first port and a second port;
connecting first ports of the second plurality of devices to the second PCIe switch;
connecting second ports of the second plurality of devices to the second interface port;
and
connecting the first interface port to the second interface port.

19. The computer-implemented method of claim 18, wherein each device of the second plurality of devices is shared among the second plurality of nodes via the second PCIe switch, wherein each device of the second plurality of devices is shared among the first plurality of nodes via a connection path comprising the first PCIe switch-the first interface port-the second interface port.

20. A non-transitory computer-readable storage medium storing instructions for supporting a scalable storage box that comprises a first PCI Express (PCIe) switch, a first switch port connected to the first PCIe switch, a first device port and a first plurality of devices, each device of the first plurality of devices comprising a first port and a second port, that, when executed by at least one processor of a computing system, cause the computing system to:
connect first ports of the first plurality of devices to the first PCIe switch;
connect second ports of the first plurality of devices to the first device port, and connect the first plurality of devices to be connected to a first plurality of nodes via the first PCIe switch.

* * * * *